(12) United States Patent
Dantuluri et al.

(10) Patent No.: US 11,645,454 B2
(45) Date of Patent: May 9, 2023

(54) CROSS CHANNEL DIGITAL FORMS INTEGRATION AND PRESENTATION SYSTEM

(71) Applicant: BANK OF AMERICA CORPORATION, Charlotte, NC (US)

(72) Inventors: Indradeep Dantuluri, Harrisburg, NC (US); Pavan Chayanam, Alamo, CA (US); Travon Lamone Kelly, Lancaster, SC (US); Michael McClish, Charlotte, NC (US); Ashwin Srinivas Parameswaran, Harrisburg, NC (US); Rupal V. Shah, Loomis, CA (US); Surendran Thiyagarajan, Pleasant Hill, CA (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 17/533,355

(22) Filed: Nov. 23, 2021

(65) Prior Publication Data
US 2022/0350959 A1    Nov. 3, 2022

Related U.S. Application Data

(60) Provisional application No. 63/182,367, filed on Apr. 30, 2021.

(51) Int. Cl.
| | |
|---|---|
| G06F 40/186 | (2020.01) |
| H04L 67/04 | (2022.01) |
| G06F 40/106 | (2020.01) |
| G06F 40/174 | (2020.01) |
| G06F 40/123 | (2020.01) |
| G06F 3/16 | (2006.01) |
| G06F 9/451 | (2018.01) |

(52) U.S. Cl.
CPC ............ *G06F 40/186* (2020.01); *G06F 3/167* (2013.01); *G06F 9/451* (2018.02); *G06F 40/106* (2020.01); *G06F 40/123* (2020.01); *G06F 40/174* (2020.01); *H04L 67/04* (2013.01)

(58) Field of Classification Search
CPC ....... G06F 40/186; G06F 40/106; G06F 9/451
See application file for complete search history.

(56) References Cited

U.S. PATENT DOCUMENTS 5,794,205 A    8/1998 Walters et al.
9,009,585 B1 *  4/2015 Chetrit .................... G06F 9/453
                                                      715/221
(Continued)

FOREIGN PATENT DOCUMENTS

WO    2017059500 A1    4/2017

*Primary Examiner* — Shahid K Khan
(74) *Attorney, Agent, or Firm* — Moore & Van Allen PLLC; Nicholas C. Russell

(57) ABSTRACT

Embodiments of the invention are directed to a system, method, or computer program product for a template based design approach for cross channel digital form integration and presentation. The system allows for onboarding of various types of forms to push them out to users via multiple various user viewing channels. The invention identifies the sections or fields of the form that require user input and presents those fields using an advanced digital solution illustrated in the channel format. The system is expandable, allowing for a single backend upload of additional forms irrespective of the channel.

17 Claims, 8 Drawing Sheets

(56) References Cited

U.S. PATENT DOCUMENTS

| | | | |
|---|---|---|---|
| 9,208,253 B2 * | 12/2015 | Zoheir | G06F 16/9577 |
| 9,361,598 B2 | 6/2016 | Bird | |
| 9,639,597 B2 | 5/2017 | Eigner et al. | |
| 9,736,540 B2 | 8/2017 | Anderson et al. | |
| 9,824,080 B2 * | 11/2017 | Kok | G06F 3/0605 |
| 9,965,151 B2 | 5/2018 | Zaveri et al. | |
| 10,127,250 B2 | 11/2018 | Dingman et al. | |
| 10,372,733 B2 | 8/2019 | Eigner et al. | |
| 10,445,419 B2 * | 10/2019 | Gaither | G06F 40/174 |
| 10,460,024 B2 * | 10/2019 | Gaither | G06F 40/174 |
| 10,585,982 B2 | 3/2020 | Brisebois et al. | |
| 10,643,164 B2 | 5/2020 | Macciola et al. | |
| 10,657,200 B2 * | 5/2020 | Gaither | G06F 40/174 |
| 10,686,772 B2 | 6/2020 | Haddad | |
| 10,699,349 B2 | 6/2020 | Roberts et al. | |
| 10,796,370 B2 | 10/2020 | Rakshe et al. | |
| 10,838,699 B2 | 11/2020 | Dayanandan | |
| 10,839,141 B2 | 11/2020 | Warila et al. | |
| 10,891,430 B2 * | 1/2021 | Carter | G06V 10/945 |
| 11,029,838 B2 | 6/2021 | Lemay et al. | |
| 11,113,333 B2 | 9/2021 | Maharajh et al. | |
| 11,140,233 B2 | 10/2021 | Glommen et al. | |
| 11,228,617 B2 | 1/2022 | Raleigh | |
| 11,228,640 B2 | 1/2022 | Singh et al. | |
| 2002/0194219 A1 * | 12/2002 | Bradley | G06F 40/117 725/9 |
| 2007/0180148 A1 | 8/2007 | Yadidian | |
| 2007/0198910 A1 | 8/2007 | Jensen et al. | |
| 2007/0233495 A1 | 10/2007 | Agapi et al. | |
| 2009/0138794 A1 * | 5/2009 | Becker | G06F 9/451 715/234 |
| 2011/0191156 A1 | 8/2011 | Etheredge et al. | |
| 2011/0320605 A1 * | 12/2011 | Kramer | H04L 67/1097 709/226 |
| 2012/0054593 A1 | 3/2012 | Naderi | |
| 2012/0159314 A1 * | 6/2012 | Schrier | G06F 16/9577 715/252 |
| 2013/0021377 A1 * | 1/2013 | Doll | G09G 5/14 345/649 |
| 2013/0198628 A1 * | 8/2013 | Ethier | G06F 9/453 715/709 |
| 2013/0283195 A1 | 10/2013 | Bilgen et al. | |
| 2014/0222553 A1 * | 8/2014 | Bowman | G06Q 30/0276 705/14.72 |
| 2014/0223277 A1 | 8/2014 | Kimber et al. | |
| 2014/0330659 A1 | 11/2014 | Yopp et al. | |
| 2015/0039988 A1 | 2/2015 | Mei | |
| 2016/0196110 A1 | 7/2016 | Yehoshua et al. | |
| 2017/0192950 A1 * | 7/2017 | Gaither | G10L 15/22 |
| 2018/0046609 A1 * | 2/2018 | Agarwal | G06F 9/451 |
| 2018/0239837 A1 | 8/2018 | Wang | |
| 2019/0057161 A1 * | 2/2019 | Ackerman | G06F 16/955 |
| 2019/0179885 A1 | 6/2019 | Wong et al. | |
| 2019/0238614 A1 * | 8/2019 | Ballinger | H04L 69/24 |
| 2020/0401648 A1 | 12/2020 | Kol et al. | |
| 2021/0157618 A1 | 5/2021 | Moon | |
| 2021/0326093 A1 | 10/2021 | Hinckley et al. | |

* cited by examiner

Figure 8a
800

NAVIGATE ACTION 802
```
{
"action": "navigate",
"navigateTo": "Names"
}
```

COLLECT ACTION 804
```
{
"action": "collect",
"widgets": [
  {
    "dataId": "firstName",
    "widgetID": "nameTXT"
  }
]
}
```

ENABLE ACTION 806
```
{
"action": "enable",
"widgets": [
  "Continue_Button"
]
}
```

Figure 8b
810

DISABLE ACTION 812
```
{
"action": "disable",
"widgets": [
  "Continue_Button"
]
}
```

ERROR ACTION 814
```
{
"action": "error",
"target": "id"
}
```

DELEGATE ACTION 816
```
{
"action": "delegate",
"context": "Reason"
}
```

CROSS CHANNEL DIGITAL FORMS INTEGRATION AND PRESENTATION SYSTEM

CROSS-REFERENCE TO RELATED APPLICATIONS

This application is a U.S. Non-provisional application claiming priority to U.S. Provisional Patent Application No. 63/182,367 filed Apr. 30, 2021 titled Cross Channel Digital Forms Integration and Presentation System, the contents of which are hereby incorporated by reference in its entirety.

BACKGROUND

Currently, there are a multitude of types of forms for users that have various templates and requirements. Typically, depending on the entity, the form may unique formatting specific to that form. When digitizing these forms several challenges arise such as displaying forms on a mobile device, onboarding of each form and each template, and allowing for inline editing. As such, a need exists for a cross channel digital form integration and presentation system.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for a cross channel digital form integration and presentation platform.

Currently, there are many different types of user forms, from government forms, to financial forms, to contracts, agreements, and the like. These forms often contain multiple pages of uniquely formatted content and instructions. The system is able to digitize these forms irrespective of the user channel in order for the user to accurately view and fill out the forms. Currently, the challenges with digitizing such forms include properly displaying the forms on the various channel the user is utilizing, the expense associated with onboarding each new form and each unique template, and finally challenges with inline editing of the forms.

The invention enables onboarding of various types of forms to push them out to users that may be using any channel, such as different operating systems, mobile, web, or the like. As such, the invention provides a cross channel solution leveraging each channels technology. In this way, the system displays a form the way the operating system would provide. The invention identifies the sections or fields of the form that require user input and presents those fields using and advanced digital solution and posts the user inputs to a backend server to generate a populated digital form. The system is expandable, allowing for a single backend upload of additional forms irrespective of the channel.

The system follows a template based design approach. In this way, each client channel will host a template for how a particular form should be applied via that channel. Each client channel will be able decide how the User Interface (UI) templates are organized, the color, the layout, and the like. In this way, the client channel controls these elements of the form when displayed to the user. In this way, the system provides a predetermined UI template that is channel specific that can be repurposed for any kind of form regardless of complexity.

Embodiments of the invention are directed to a system, method, or computer program product for a cross channel digital form integration and presentation, the invention comprising: generating and transmitting user interface (UI) templates to one or more channels; extracting data from a form, wherein the data comprises questions on the form and input requirements for the questions; creating a data format that provides formatting instructions to a channel of the one or more channels, wherein the data format provides the channel with text to input into one or more UI templates; creating a flow format that provides formatting instructions to the channel, wherein the flow format provides the channel with a flow of UI templates to present to the user; and displaying, via the channel, to the user the form in the appropriate channel format via one or more UI templates in a sequenced order.

In some embodiments, the data format comprises one or more JSON providing instructions for the flow of UI templates for the channel to the user, validation rule to apply to each UI template, and recognition of interdependent UI template.

In some embodiments, the flow format comprises one or more JSON providing instructions for the text to be displayed on the channel for each UI template.

In some embodiments, training the channel of the one or more channels to perform logic, present questions, and transmit data back using open standard file format and data interchange format in value pairs and arrays.

In some embodiments, the invention further comprises reconstructing the form with user input from the channel into one or more UI templates in the sequence order.

Ins some embodiments, the one or more UI templates further comprise pre-programed input templates that correspond to a type of input required by the user to fill out a form.

In some embodiments, generating UI templates further comprises: determining one or more types of user inputs required for a form, wherein one or more types of user inputs comprise question data and the input requirements for the user; generating a displayable form to the user in an appropriate channel format; and establishing coloring, formatting, and flow associated with an entity for each of the one or more channels.

In some embodiments, the input requirements further comprise a type of input including drop down selection, check box selection, or fill in selection.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
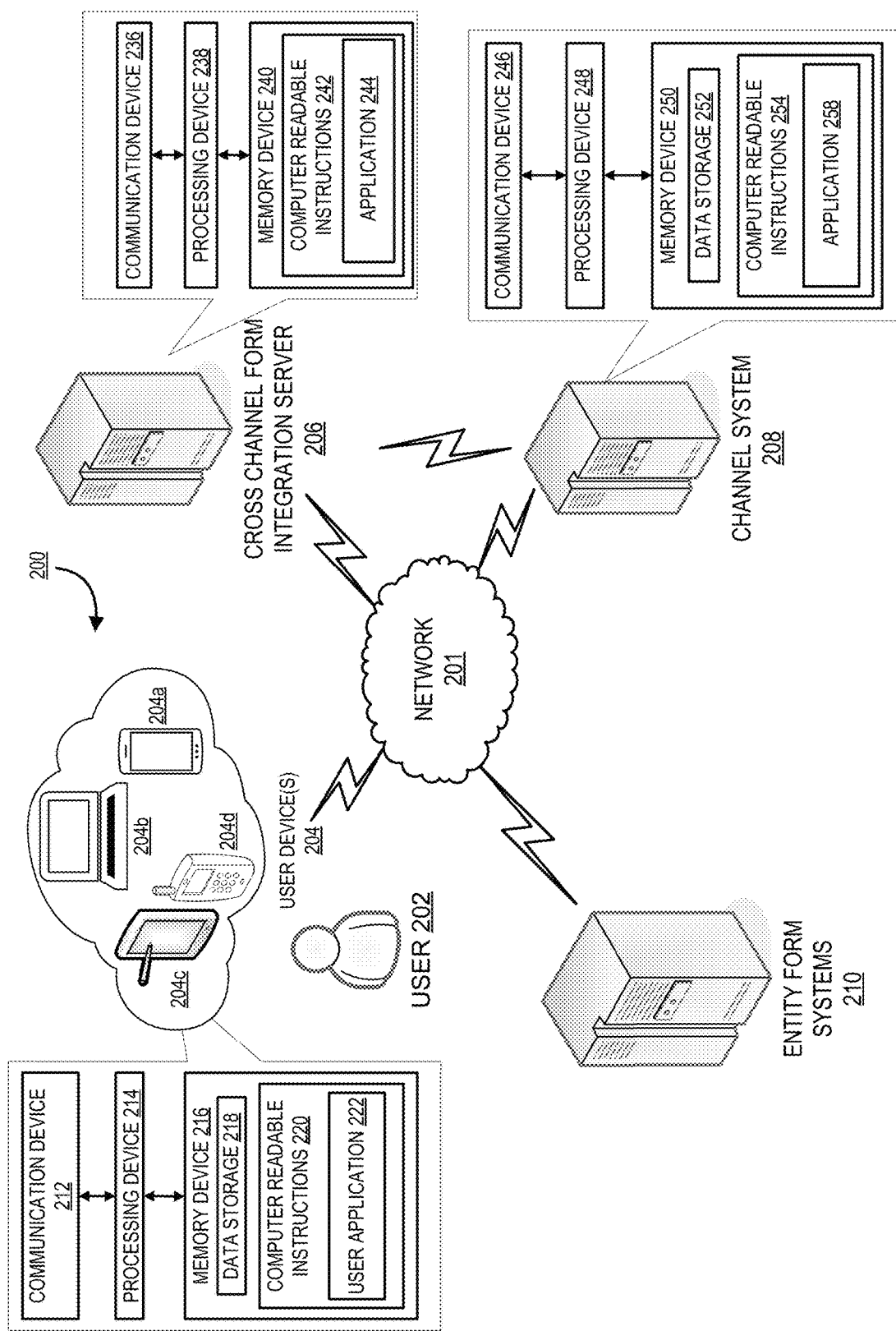
Figure 2:
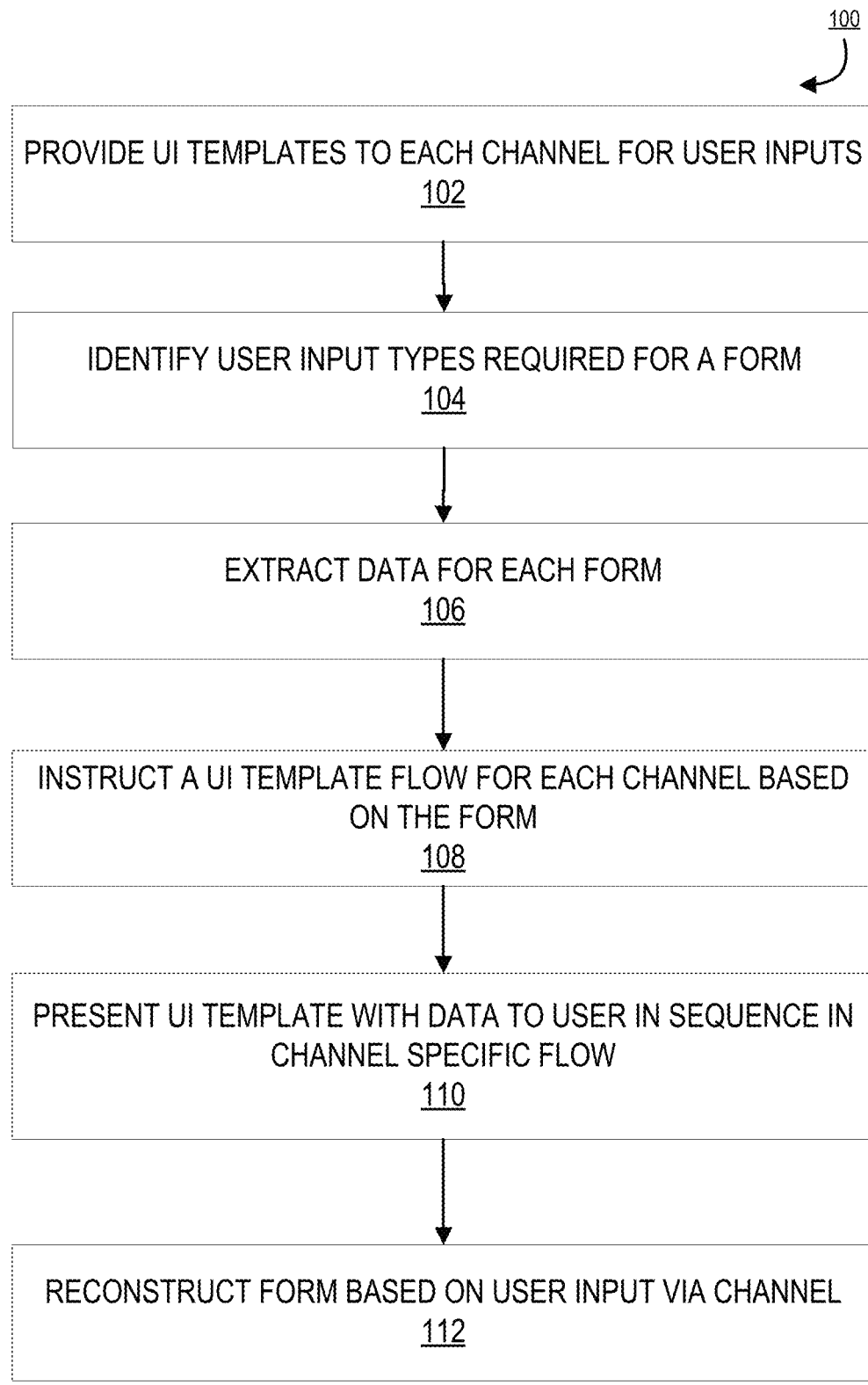
Figure 3:
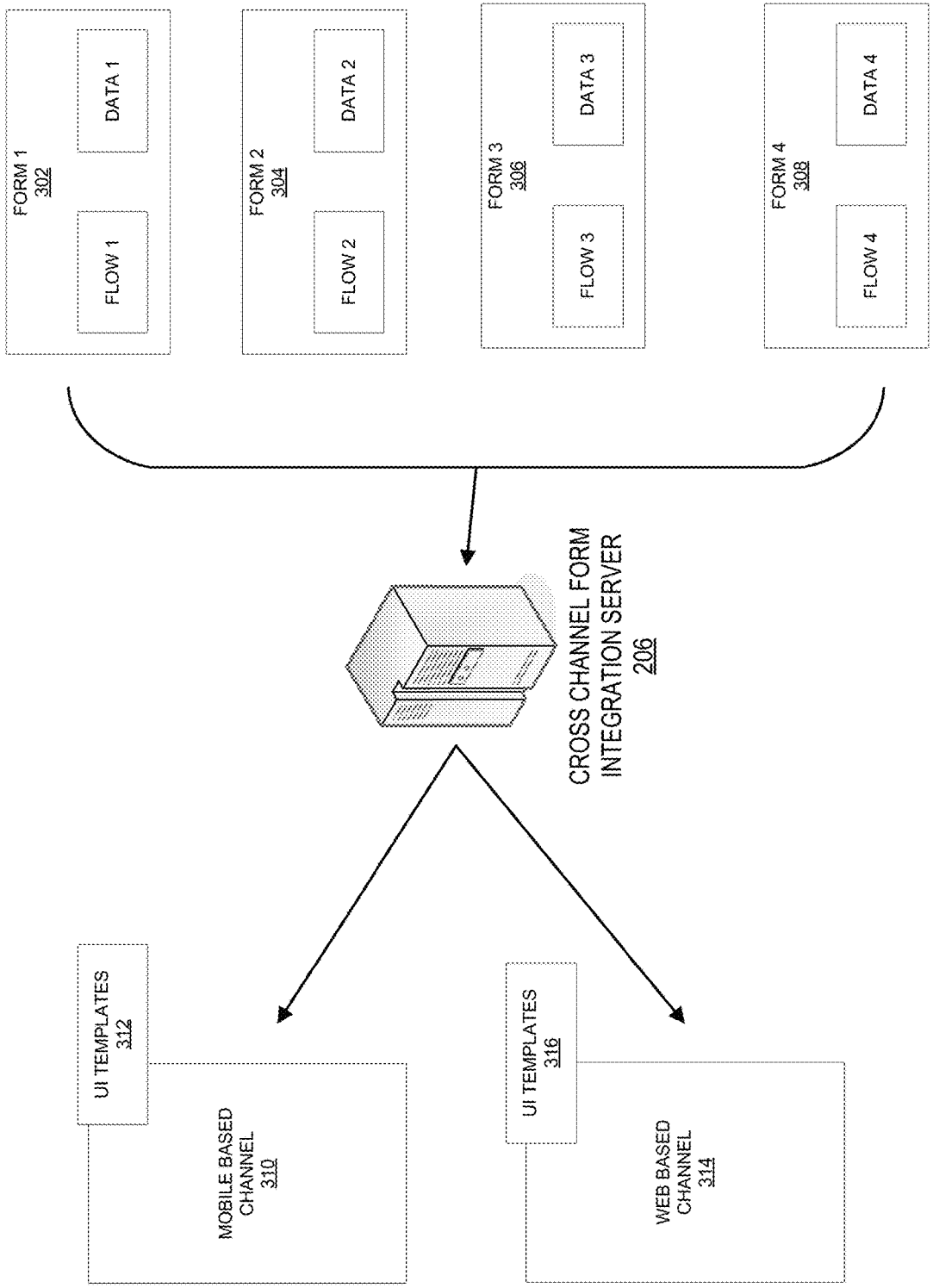
Figure 4:
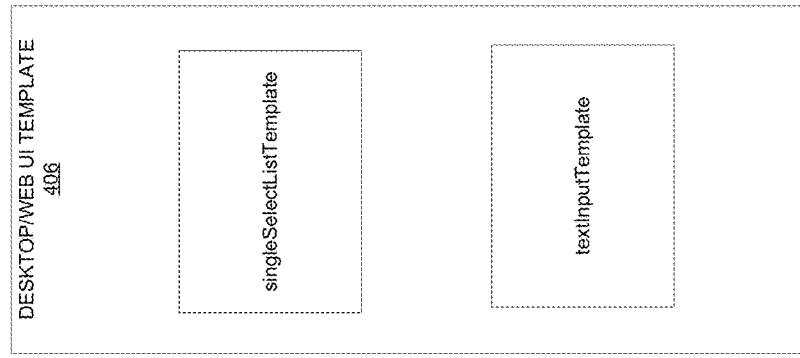
Figure 4:
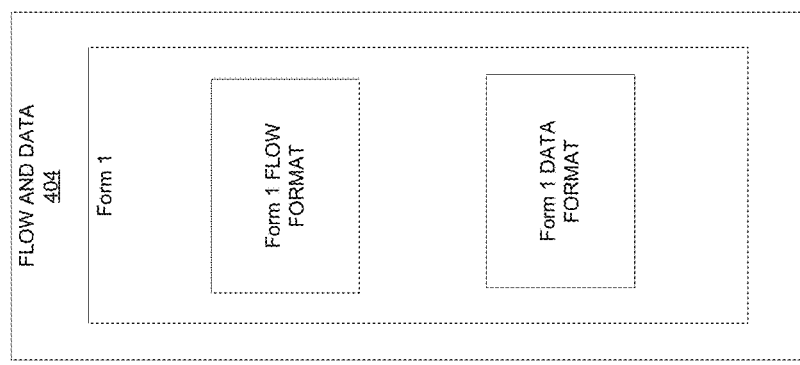
Figure 4:
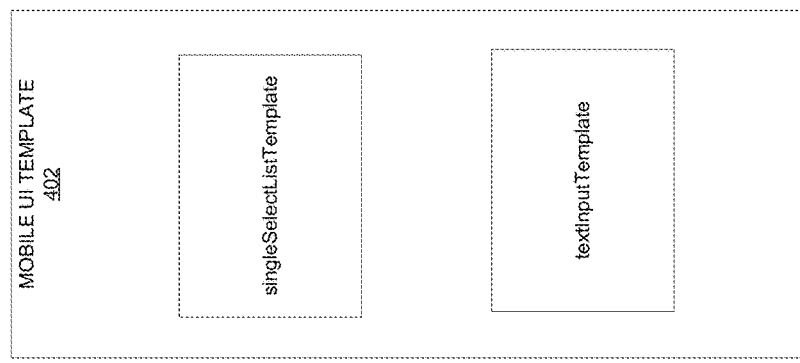
Figure 5:
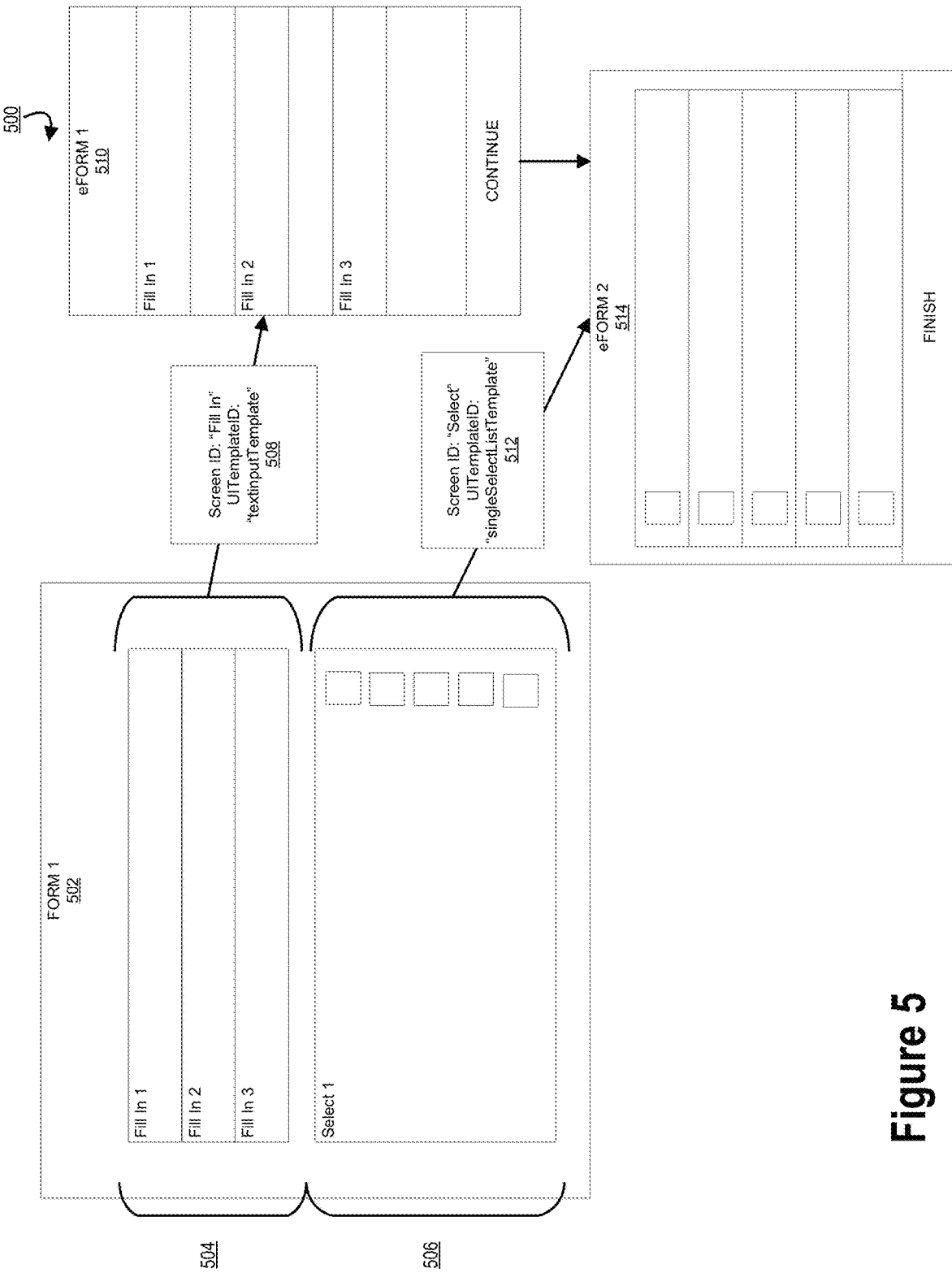
Figure 6C:
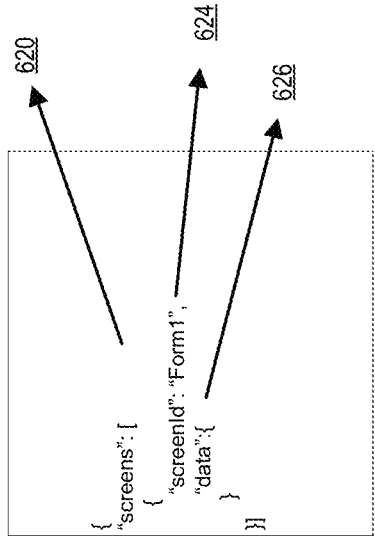
Figure 6A:
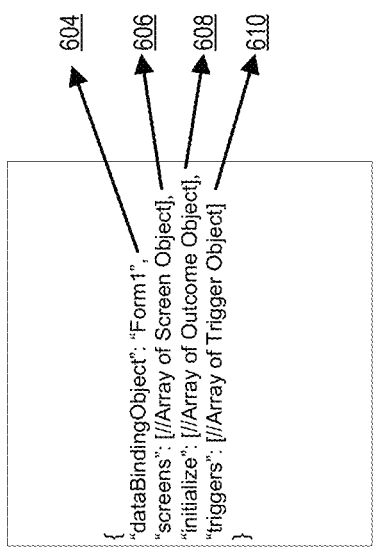
Figure 6B:
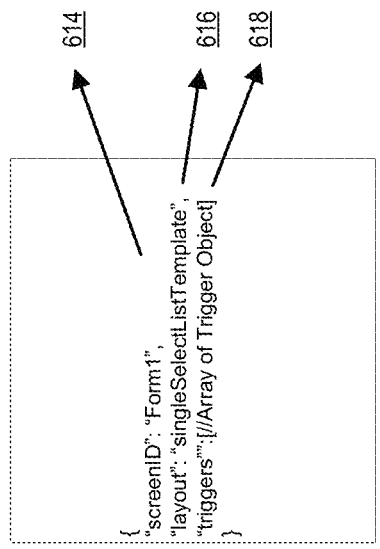
Figure 7:
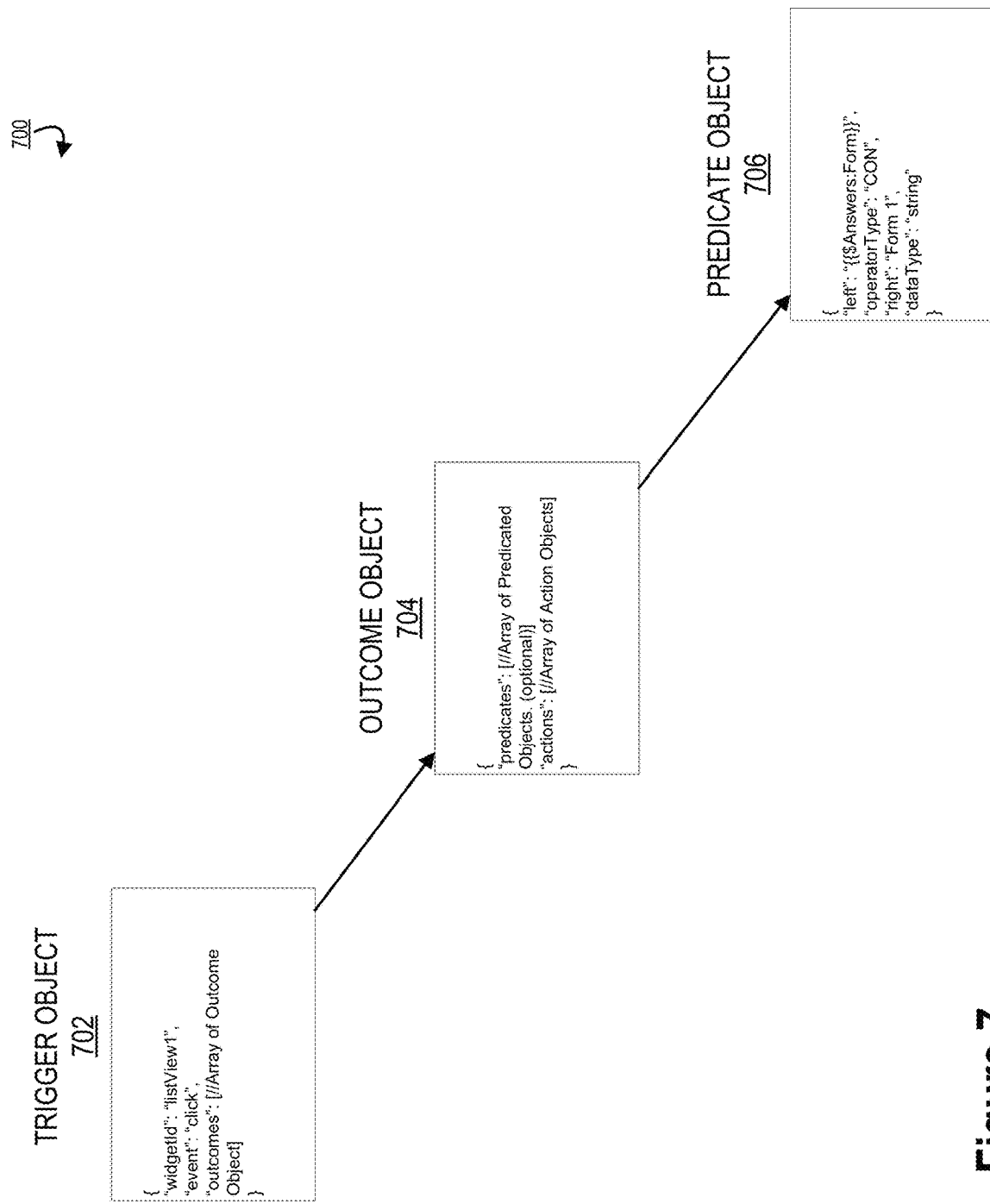

Having thus described embodiments of the invention in general terms, reference will now be made to the accompanying drawings, wherein:

FIG. 1 provides a cross channel digital forms integration and presentation system environment, in accordance with one embodiment of the present invention;

FIG. 2 illustrates a high level process flow of the cross channel digital forms integration and presentation process, in accordance with one embodiment of the invention;

FIG. 3 illustrates a high level process flow of the cross channel digital forms integration and presentation system interactions, in accordance with one embodiment of the invention;

FIG. 4 illustrates a high level process flow of template ownership across the cross channel digital forms integration and presentation system, in accordance with one embodiment of the invention;

FIG. 5 illustrates a high level process flow illustrating the process of form breaking down into UI templates for channel distribution, in accordance with one embodiment of the invention;

FIG. 6a illustrates a high level flow template structure, in accordance with one embodiment of the invention;

FIG. 6b illustrates a high level flow template screen object, in accordance with one embodiment of the invention;

FIG. 6c illustrates a high level data template structure, in accordance with one embodiment of the invention;

FIG. 7 illustrates a high level flow template of a trigger object, in accordance with one embodiment of the invention;

FIG. 8a illustrates a high level flow template for navigation actions, in accordance with one embodiment of the invention; and FIG. 8b illustrates a high level flow template for disable actions, in accordance with one embodiment of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to a system, method, or computer program product for a template based design approach for cross channel digital form integration and presentation. The system allows for onboarding of various types of forms to push them out to users via multiple various user viewing channels. The invention identifies the sections or fields of the form that require user input and presents those fields using an advanced digital solution illustrated in the channel format. The system is expandable, allowing for a single backend upload of additional forms irrespective of the channel.

As used herein, a "user" may be an individual in communication with an entity and reviewing one or more forms or documents associated with the communication or otherwise utilized the applications disclosed herein. A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software. In some embodiments, the term "platform" including the temporal platform may refer to a platform that is used as a base upon which other applications, processing, or technologies are distributed including applications, activities, integration into currently used applications, integration into systems, presentation of user interfaces, and the like.

Further, the embodiments described herein may refer to use of a form. A form may be any physical or digital document requiring a user to fill out, check, or otherwise mark in association with a communication with an entity.

The embodiments described herein may also refer to a channel or a channel client. A channel may be any software or operating system that hosts a user to view a form. This may also include whether the user is viewing the form on the channel via mobile or web based.

FIG. 1 provides a cross channel digital forms integration and presentation system environment 200, in accordance with one embodiment of the present invention. As illustrated in FIG. 1, the channel system 208 is operatively coupled, via a network 201 to the user device 204, to the cross channel form integration server 206, and to entity form systems 210. In this way, the channel system 208 can send information to and receive information from the user device 204, the cross channel form integration server 206, and the entity form systems 210. FIG. 1 illustrates only one example of the system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network.

As illustrated in FIG. 1, the channel system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the cross channel form integration server 206, the user device 204, and the entity form systems 210. As such, the communication device 246 generally comprises a modem, server, or other device for communicating with other devices on the network 201.

As further illustrated in FIG. 1, the channel system 208 comprises computer-readable instructions 254 stored in the memory device 250, which in one embodiment includes the computer-readable instructions 254 of an application 258. In some embodiments, the memory device 250 includes data storage 252 for storing data created and/or used by the application 258. In the embodiment illustrated in FIG. 1 and described throughout much of this specification, the application 258 may perform the functions disclosed herein. The channel system 208 recognizes the channel the user is using and requesting a form from. The system may use the appropriate form for the user and for the channel selected by the user.

As illustrated in FIG. 1, the cross channel form integration server 206 generally comprises a communication device 236, a processing device 238, and a memory device 240. As further illustrated in FIG. 1, the cross channel form integration server 206 comprises computer-readable instructions 242 stored in the memory device 240, which in one embodiment includes the computer-readable instructions 242 of an application 244.

In the embodiment illustrated in FIG. 1, the application 244 allows the cross channel form integration server 206 to be linked to the channel system 208 to communicate, via a network 201, the information related to transactions associated with entity form systems 210.

FIG. 1 also illustrates a user device 204. The user device 204 may be any communication device such as a smart phone 204a, a telephone 204d, a tablet 204c, a computer 204b, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the cross channel form integration server 206, the channel system 208, and the entity form systems 210. As such, the communication device 212 generally comprises a modem, server, or other device for communicating with other devices on the network 201.

As further illustrated in FIG. 1, the user device 204 comprises computer-readable instructions 220 stored in the memory device 216, which in one embodiment includes the computer-readable instructions 220 of a user application 222. A user device 204 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, laptop computers, cameras, video recorders, audio/video player, radio, GPS devices, any combination of the aforementioned, or the like. Although only a single user device 204 is depicted in FIG. 1, the system environment 200 may contain numerous mobile devices 204.

The entity form systems 210 are operatively coupled to the channel system 208, the cross channel form integration server 206, and/or the user device 204 through the network 201. The entity form systems 210 have systems with devices the same or similar to the devices described for the channel system 208, the cross channel form integration server 206, and/or the user device 204 (i.e., communication device, processing device, and memory device). Therefore, the entity form systems 210 communicate with the channel system 208, the cross channel form integration server 206, and/or the user device 204 in the same or similar way as previously described with respect to each system.

As such, the entity form systems 210 generally comprises a communication device, at least one processing device, and a memory device. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device is operatively coupled to the communication device and the memory device. The processing device uses the communication device to communicate with the network 201 and other devices on the network 201. As such, the communication device generally comprises a modem, server, wireless transmitters or other devices for communicating with devices on the network 201. The memory device typically comprises a non-transitory computer readable storage medium, comprising computer readable/executable instructions/code, such as the computer-readable instructions, as described below.

As further illustrated in FIG. 1, the entity system 210 comprises computer-readable instructions or computer readable program code stored in the memory device, The computer readable instructions, when executed by the processing device 138 are configured to cause the processing device to perform one or more steps described in this disclosure such as to provide entity specific forms to the network 201.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates a high level process flow of the cross channel digital forms integration and presentation process 100, in accordance with one embodiment of the invention. As illustrated in block 102, the process 100 is initiated by providing one or more UI templates to each channel for user inputs. This may include one or more types of user inputs, but may include the coloring, formatting, and the like associated with the channel such that the flow of the page will be similar to the channel pages visualized by the user.

As illustrated in block 104, the process 100 continues by identifying user input types required for a form. In this way, the system may identify the data that includes the questions or input requirements for the user. This may also include the type of input, such as a drop down selection, check box selection, fill in, or the like.

As illustrated in block 106, the process 100 continues by extracting the particular sections of the form that require user input. This may be specific questions or the like on the form requiring user input.

The process 100, continues by instructing a UI template flow from each channel associated with a user based on the particular sections of the form requiring user input, as illustrated in block 108. In this way, the first portion of the form may require a check box selection and the second portion of the form may require a fill in section. The system may instruct the channel to utilize the UI template associated with a check box selection first, followed by a UI template associated with a fill in section.

The one or more UI templates from the channel are then presented to the user with the data in a sequenced order, as illustrated in block 110. The data is presented in channel specific flow, such that the channel font, color, and the like is channel specific, but the data provided is based on the form and the data extracted from the form.

Finally, as illustrated in block 112, the process 100 is finalized by reconstruction of the form based on user input at the channel.

FIG. 3 illustrates a high level process flow of the cross channel digital forms integration and presentation system interactions 300, in accordance with one embodiment of the invention. As illustrated, the cross channel form integration server 206 may accept forms from one or more entities for user input. These forms may include Form 1 302, Form 2 304, Form 3 306, and Form 4 308. One will appreciated that while only four forms are illustrated in FIG. 3, there may be many more forms associated with the system. Each form may have a flow and a data associated with it. The flow may be the visual aspects of the form, such as the color, font, type, and the like. The data may include the specific questions the form may ask the user.

The cross channel form integration server 206 may provide the data for each form in a specific parsed out order to each channel. As illustrated in FIG. 3, the mobile based channel 310 and the web based channel 314 are illustrated. While only two channels are illustrated, one of skill in the art will appreciate that several other channels may be available for a user to access a form. As illustrated, each channel has a pre-stored UI template. The mobile based channel 310 has mobile UI templates 312 and the web based channel 314 has UI templates 316. These templates comprise the font, color, format, and the like associated with the channel. The cross channel form integration server 206 provides the data from the various forms in a specific order to the channel for user display via the channel.

FIG. 4 illustrates a high level process flow of template ownership across the cross channel digital forms integration and presentation system 400, in accordance with one embodiment of the invention. This illustrates the communication with the system to the channel in order for the channel to know what UI template to present, the order to present the UI template, and the data to present via the UI template. The system trains the channel to perform the logic, present the questions, and transmit the data back to the system. The system utilizes an open standard file format and data interchange format that uses human-readable text to store and transmit data objects consisting of attribute, such a value pairs and arrays. This may include JSON or the like file formats. The system uses two of these open standard file formats a flow and a data.

As illustrated in block 404 the flow and data formats are provided to the channel. The flow provides instructions for the flow of UI templates for the channel to user, additional validation rules to apply to each UI template, and provides an indication of it there are any interdependent UI templates (for example, a second question in a string of questions is dependent on how the user answers the first question in the string). The data provides the actual text that needs to be displayed on the user device screen, such as a question "what is your name" or the like. The formats are channel agnostic and does not contain any colors, formats, fonts, or the likes associated with the data.

The flow and data 404 are transmitted to the channel systems. These may be a mobile device or a desktop device or the like. As illustrated in FIG. 4, the flow and data 404 may be transmitted to a mobile device that comprises a mobile UI template 402. The mobile UI template 402 is pre-populated at the channel level and is able to accept the flow and data 404 to transmit a display of the information on the user device via the mobile channel. The mobile UI template 402 comprises the various ways in which the data is displayed, such as via a selection list or via user text input. As such, if the flow and data 404 require a user to input text into a field of the form, the mobile UI template will display the form data via the textInputTemplate. If the flow and data 404 require a user to select a box or select an item within the form, the mobile UI template will display the form data via the singleSelectListTemplate.

The desktop/web UI template 406 is pre-populated at the channel level and is able to accept the flow and data 404 to transmit a display of the information on the user device via the desktop or web channel. The desktop/web UI template 406 comprises the various ways in which the data is displayed, such as via a selection list or via user text input. As such, if the flow and data 404 require a user to input text into a field of the form, the desktop/web UI template will display the form data via the textInputTemplate. If the flow and data 404 require a user to select a box or select an item within the form, the desktop/web UI template will display the form data via the singleSelectListTemplate.

FIG. 5 illustrates a high level process flow illustrating the process of form breaking down into UI templates for channel distribution 500, in accordance with one embodiment of the invention. No matter how the form looks the invention does not present the form and its complexities as is to the user. The system breaks down the original form into sets of inputs for the user. The system identifies the parts of the form that require user input and transmit those parts of the form to the user. The user device is pre-populated with the appropriate channel specific format, color, and the like for the data. The system then presents these user input sections to the user in the channel associated with the user device.

For example, as illustrated in FIG. 5, Form 1 502 is identified to have two sections that require user input. These include a fill in section 504 and a select section 506. In this way, the system identifies the locations on a form that the user is required to put a text input. This input could be writing or filling in a portion, such as writing a name, date, or other information. This input could be selecting a box, selection one option from several options, radio buttons, calendars, notes, drop down selection, signature, and the like. With these limited input options, the system is able to generate almost every possible form a user may need to populate based on mixing and matching the various input options in order to create any number of forms regardless of form complexity. The system identifies two sections in Form 1 502, one section that the user is required to fill in the blank 504 and one section where the user is required to check one or more boxes 506. The complexity of Form 1 502 outside of these two sections is irrelevant and is not transmitted to the user channel.

Each channel will have pre-programed input templates that are called UI templates. Each channel has the pre-programmed UI templates, that for any type of form the system may notify the channel of the order of the pre-programmed UI templates for each type of form. For example, for the form illustrated in FIG. 5, the system may notify the channel to utilize pre-programmed UI template "testinputTemplate" followed by pre-programmed UI template "singleSelectListTemplate", which correspond to the type of input the user may be required to provide. The channel may input the data from the system into the pre-programmed UI template to generate a displayable form to the user in the appropriate channel format. The system may collect the data from the channel and populate the original form for uniformity.

In this way, as illustrated in block 508, the system processes the fill in the blank 504 section and provides information to the channel to present the section to the user in the form of the eForm 1 510. This includes a screen identification, a UI template identification for the channel, and the data to put into the eForm 1 510.

Furthermore, the system may select an order of eForms, such as presentation of eForm 1 510 first then eForm 2 514. After the user has filled in Fill in 1, Fill in 2, and Fill in 3, the user may select continue. Upon selection, the user may be presented eForm 2 514. eForm 1 510 and eForm 2 514 may be part of the same Form 502 but the system may divide them based on user input type for appropriate channel UI template presentation for the various parts of the form 1 502. For eForm 2 514, instructions such as the screen identification, UI template identification, and the data to be presented may be transmitted to the channel for display as illustrated in block 512.

FIG. 6a illustrates a high level flow template structure, in accordance with one embodiment of the invention. This illustrates the communication with the system to the channel in order for the channel to know what UI template to present, the order to present the UI template, and the data to present via the UI template. The system trains the channel to perform the logic, present the questions, and transmit the data back to the system. The system utilizes an open standard file format and data interchange format that uses human-readable text to store and transmit data objects consisting of attribute, such a value pairs and arrays. This may include JSON or the like file formats. The system uses two of these open standard file formats a flow and a data. The flow, as illustrated in FIG. 6a, has the flow of UI templates for the channel to user, additional validation rules to apply to each UI template, and provides an indication of it there are any interdependent UI templates (for example, a second question in a string of questions is dependent on how the user answers the first question in the string). The data format is further illustrated below in FIG. 6c.

In this way, each flow has an array of UI templates, each template object has an array of triggers, each trigger object has an array of outcomes, each outcome object has an array of predicates and an array of actions.

As illustrated in section 604 the flow format provides the corresponding data file name associated with this flow format. Next, as illustrated in section 606 the flow format provides instructions for all screens associated with the form, as represented in an array of Screen Objects. As illustrated in section 608, the flow format provides an array of outcome Objects. These are used when the flow needs to be started with a different screen other than the first screen presented. As illustrated above in FIG. 5, a single form may be parsed into several different screens for the user to view the form appropriately at the channel. Finally, as illustrated in block 610, this flow format provides an array of trigger objects. These trigger objects are used when common triggers are required across screens in order to reduce duplicate code.

FIG. 6b illustrates a high level flow template screen object, in accordance with one embodiment of the invention. As illustrated each flow template object would have a business name, the one illustrated in FIG. 6b is Form 1 614. This is the screen identification set by the channel for every screen. This identification is used for mapping the screen data in the data format. Next, as illustrated in section 616, the UI template to be used in the screen of the user is provided, which in this case is singleSelectListTemplate, which is a selection list that allows a user to select one of a list of options. This UI template has to match the UI template pre-populated and published to the channel. Finally, as illustrated in section 618, array of triggers associated with the screen are provided. This is where all the click actions and order of selection is provided for user navigation. The trigger is the selection of a response by the user or a user entering data into a text box. This trigger confirms that the user performed the correct trigger and allows for proceeding to the next question within the form.

FIG. 6c illustrates a high level data template structure, in accordance with one embodiment of the invention. The data format provides the UI template with the data and text to be inputted into the UI. As illustrated in section 620, the data format provides an array of screen data objects for the particular flow. Next, as illustrated in section 624 the screen identification is matched and identified as Form 1. Finally, as illustrated in section 626 the data format defines a object with a key value pair. The key value pair is a variable defined in the screen and value is the one to be replaced with. In this way, the data template structure provides the text oft the form to the UI for display in the channel specific manner.

FIG. 7 illustrates a high level flow template of a trigger object 700, in accordance with one embodiment of the invention. As illustrated in block 702 the trigger object contains doe for a UI identifier associated with the form and the event. The event associated with the user action, in this case the action is a "click" followed by a list of possible outcomes associated with the user action. This outcome can include collecting data, moving to the next UI template screen or the like.

Next, as illustrated in block 704, the process 700 continues to the outcome object. The outcome object 704 comprises predicates that provides a list of conditions that need to be satisfied before executing the action. Predicates are prerequisites that are required before an outcome can be produced. For example, if the form asks for an email address of the user, the predicate can confirm that the user is inputting text, such as an "@" that delineates the user has inputted what appears to be an appropriate input for the question. Furthermore, the outcome object 704 provides an array of actions that need to be executed based on the user actions, which are outlined in further detail below in FIG. 8a and FIG. 8b.

In this way, each flow has an array of UI templates, each template object has an array of triggers, each trigger object has an array of outcomes, each outcome object has an array of predicates and an array of actions.

Finally, as illustrated in block 706, the process 700 is finalized with the predicted object. The predicted object 706 provides a static or dynamic equation with a type of operation that is needed to be performed and the data type for the information, such as strings, numbers, dates, or the like.

FIG. 8a illustrates a high level flow template for navigation actions 800, in accordance with one embodiment of the invention. The navigation actions 802 include a definition of the type of action to be performed by the user and defines the next screen to navigate to based on the action. Next, the collect action 804 includes a definition of the action to be performed, and an array of elements for which data needs to be collected for that action. Furthermore, the collect action 804 defines the key to where the data needs to be mapped to and the UI template identifier associated with the data collection. Finally, the enable action 806 defines the type of action to be performed and provides an array of UI identifiers as strings that need to be enabled.

FIG. 8*b* illustrates a high level flow template for disable actions 810, in accordance with one embodiment of the invention. As illustrated in the disable action 812, the process 810 is initiated by defining the type of action to be performed and provides an array of UI template identifiers as strings that need to be disabled. The error action 814 defines the type of action to be performed and identifies the UI element that needs to be shown based on the error. Finally, the delegate action 816 defines the type of action to be performed and provides the context and/or reason for the delegation of the action back to the wrapper to handle the specific function.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for cross channel digital form integration and presentation, the system comprising:
a memory device with computer-readable program code stored thereon;
a communication device;
a processing device operatively coupled to the memory device and the communication device, wherein the processing device is configured to execute the computer-readable program code to:
authorize and authenticate a user into an online application;
generate and transmit user interface (UI) templates to one or more channels, wherein the UI templates include channel specific font and color;
extract data from a form, wherein the data comprises questions on the form and input requirements for the questions, wherein input requirements include a drop down selection and user fill in selection;
create a data format that provides formatting instructions to a channel of the one or more channels, wherein the data format provides the channel with text to input into one or more UI templates;
create a flow format that provides formatting instructions to the channel, wherein the flow format provides the channel with a flow of UI templates to present to the user, wherein the flow format further comprises one or more JSON providing instructions for the text to be displayed on the channel for each UI template in a sequenced order; and
display, via the channel, to the user the form in the appropriate channel format via one or more UI templates in a sequenced order.

2. The system of claim 1, wherein the data format comprises one or more JSON providing instructions for the flow of UI templates for the channel to the user, validation rule to apply to each UI template, and recognition of interdependent UI template.

3. The system of claim 1, further comprising training the channel of the one or more channels to perform logic, present questions, and transmit data back using open standard file format and data interchange format in value pairs and arrays.

4. The system of claim 1, further comprising reconstructing the form with user input from the channel into one or more UI templates in the sequence order.

5. The system of claim 1, wherein the one or more UI templates further comprise pre-programed input templates that correspond to a type of input required by the user to fill out a form.

6. The system of claim 1, wherein generating UI templates further comprises:
determining one or more types of user inputs required for a form, wherein one or more types of user inputs comprise question data and the input requirements for the user;
generating a displayable form to the user in an appropriate channel format; and
establishing coloring, formatting, and flow associated with an entity for each of the one or more channels.

7. The system of claim 1, wherein the input requirements further comprise a type of input including drop down selection, check box selection, or fill in selection.

8. A computer program product for cross channel digital form integration and presentation with at least one non-transitory computer-readable medium having computer-readable program code portions embodied therein, the computer-readable program code portions comprising:
an executable portion configured for authorizing and authenticating a user into an online application;
an executable portion configured for generating and transmitting user interface (UI) templates to one or more channels, wherein the UI templates include channel specific font and color;
an executable portion configured for extracting data from a form, wherein the data comprises questions on the form and input requirements for the questions, wherein input requirements include a drop down selection and user fill in selection;
an executable portion configured for creating a data format that provides formatting instructions to a channel of the one or more channels, wherein the data format provides the channel with text to input into one or more UI templates;
an executable portion configured for creating a flow format that provides formatting instructions to the channel, wherein the flow format provides the channel with a flow of UI templates to present to the user, wherein the flow format further comprises one or more JSON providing instructions for the text to be displayed on the channel for each UI template in a sequenced order; and
an executable portion configured for displaying, via the channel, to the user the form in the appropriate channel format via one or more UI templates in a sequenced order.

9. The computer program product of claim 8, wherein the data format comprises one or more JSON providing instructions for the flow of UI templates for the channel to the user, validation rule to apply to each UI template, and recognition of interdependent UI template.

10. The computer program product of claim 8, further comprising an executable portion configured for training the channel of the one or more channels to perform logic, present questions, and transmit data back using open standard file format and data interchange format in value pairs and arrays.

11. The computer program product of claim 8, further comprising an executable portion configured for reconstructing the form with user input from the channel into one or more UI templates in the sequence order.

12. The computer program product of claim 8, wherein the one or more UI templates further comprise pre-programed input templates that correspond to a type of input required by the user to fill out a form.

13. The computer program product of claim 8, wherein generating UI templates further comprises:
determining one or more types of user inputs required for a form, wherein one or more types of user inputs comprise question data and the input requirements for the user;
generating a displayable form to the user in an appropriate channel format; and
establishing coloring, formatting, and flow associated with an entity for each of the one or more channels.

14. The computer program product of claim 8, wherein the input requirements further comprise a type of input including drop down selection, check box selection, or fill in selection.

15. A computer-implemented method for cross channel digital form integration and presentation, the method comprising:
provided a computing system comprising a computer processing device and a non-transitory computer readable medium, where the computer readable medium comprises configured computer program instruction code, such that when said instruction code is operated by said computer processing device, said computer processing device performs the following operations:
authorizing and authenticating a user into an online application;
generating and transmitting user interface (UI) templates to one or more channels, wherein the UI templates include channel specific font and color;
extracting data from a form, wherein the data comprises questions on the form and input requirements for the questions, wherein input requirements include a drop down selection and user fill in selection;
creating a data format that provides formatting instructions to a channel of the one or more channels, wherein the data format provides the channel with text to input into one or more UI templates;
creating a flow format that provides formatting instructions to the channel, wherein the flow format provides the channel with a flow of UI templates to present to the user, wherein the flow format further comprises one or more JSON providing instructions for the text to be displayed on the channel for each UI template in a sequenced order; and
displaying, via the channel, to the user the form in the appropriate channel format via one or more UI templates in a sequenced order.

16. The computer-implemented method of claim 15, wherein the data format comprises one or more JSON providing instructions for the flow of UI templates for the channel to the user, validation rule to apply to each UI template, and recognition of interdependent UI template.

17. The computer-implemented method of claim 15, wherein generating UI templates further comprises:
determining one or more types of user inputs required for a form, wherein one or more types of user inputs comprise question data and the input requirements for the user;
generating a displayable form to the user in an appropriate channel format; and
establishing coloring, formatting, and flow associated with an entity for each of the one or more channels.

* * * * *